US008869576B2

(12) United States Patent
O'Leary et al.

(10) Patent No.: US 8,869,576 B2
(45) Date of Patent: Oct. 28, 2014

(54) ROTARY ELECTRONIC UTILITY BOX LOCKING SYSTEM

(76) Inventors: Kevin Daniel O'Leary, Fresno, CA (US); Monty Andrew Contente, Fresno, CA (US)

( * ) Notice: Subject to any disclaimer, the term of this patent is extended or adjusted under 35 U.S.C. 154(b) by 395 days.

(21) Appl. No.: 12/378,233

(22) Filed: Feb. 11, 2009

(65) Prior Publication Data

US 2009/0217714 A1 Sep. 3, 2009

Related U.S. Application Data

(60) Provisional application No. 61/065,558, filed on Feb. 12, 2008.

(51) Int. Cl.
*B60R 25/04* (2006.01)

(52) U.S. Cl.
USPC ......... 70/257; 70/63; 70/275; 70/277; 70/264

(58) Field of Classification Search
USPC .............................. 70/63, 257, 277, 275, 264
See application file for complete search history.

(56) References Cited

U.S. PATENT DOCUMENTS

| | | | | | |
|---|---|---|---|---|---|
| 4,082,078 | A * | 4/1978 | Thuleen et al. | 126/197 |
| 4,174,860 | A * | 11/1979 | Shea | 292/113 |
| 4,423,914 | A * | 1/1984 | Vander Ley | 312/333 |
| 4,794,268 | A * | 12/1988 | Nakano et al. | 307/10.2 |
| 4,897,644 | A * | 1/1990 | Hirano | 340/5.62 |
| 5,058,258 | A * | 10/1991 | Harvey | 29/401.1 |
| 5,118,000 | A * | 6/1992 | Howell et al. | 220/315 |
| 5,123,691 | A * | 6/1992 | Ginn | 296/37.1 |
| 5,224,743 | A * | 7/1993 | Dawdy et al. | 292/228 |
| 5,875,948 | A * | 3/1999 | Sadler | 224/404 |
| 6,334,560 | B1 * | 1/2002 | Lentini | 224/404 |
| 6,409,064 | B1 * | 6/2002 | Bayley | 224/404 |
| 6,851,288 | B2 * | 2/2005 | Howes | 70/159 |
| 6,930,284 | B2 * | 8/2005 | Kang | 219/391 |
| 6,959,846 | B2 * | 11/2005 | Schomaker et al. | 224/404 |
| 7,156,428 | B2 * | 1/2007 | Smith | 292/201 |

(Continued)

OTHER PUBLICATIONS

Reading Truck Body, Inc.,of Shillington, Pennsylvania, "Latch-Matic", as of Jan. 8, 2009, 1 page, at http://www.readingtruckbody.com/wnew-prod-latchmatic.html.

(Continued)

*Primary Examiner* — Suzanne Barrett

(57) ABSTRACT

A rotary electronic locking system for locking utility box or storage compartments installed on trucks or other vehicles, using a remote device like a remote key fob to lock and unlock the storage compartments, or by wiring the system to the vehicle's factory-installed electronic door lock system and utilizing the remote device supplied with the factory-installed electronic door lock system to lock and unlock the storage compartments. The rotary electronic locking system operates independently from the existing handles on the storage compartments. It may be used as a primary or secondary locking system, providing additional security. The system includes a rotating rod assembly with strikers, which is rotated by an electronic actuator causing the strikers to engage with or disengage from striker plates attached to the interior of the storage compartments. A wireless remote device is used to signal the electronic actuator to rotate the rotating rod assembly or, if the system is wired into the factory-installed electronic door lock system, the remote device that operates the door locking system may be used to signal the electronic actuator to rotate the rotating rod assembly to lock or unlock the storage compartment doors.

15 Claims, 5 Drawing Sheets

(56) References Cited

U.S. PATENT DOCUMENTS

| | | | | |
|---|---|---|---|---|
| 7,234,327 | B2 * | 6/2007 | Howes | 70/159 |
| 7,334,823 | B2 * | 2/2008 | Courter et al. | 292/201 |
| 7,418,846 | B2 * | 9/2008 | James et al. | 70/159 |
| 7,516,632 | B2 * | 4/2009 | Poppell | 70/279.1 |
| 7,671,719 | B2 * | 3/2010 | Sogo | 340/5.73 |
| 7,681,767 | B2 * | 3/2010 | Cheney | 224/404 |
| 7,874,972 | B2 * | 1/2011 | Hayasaka et al. | 494/12 |
| 7,938,765 | B2 * | 5/2011 | Hayasaka | 494/12 |
| 2001/0024039 | A1 * | 9/2001 | Lippoldt et al. | 292/197 |
| 2009/0212580 | A1 * | 8/2009 | Ballhause | 292/341.16 |
| 2010/0090066 | A1 * | 4/2010 | Holemans | 244/171.3 |

OTHER PUBLICATIONS

Eberhard Hardware Manufacturing CO., Strongsville, Ohio, “No. 1-16720 series” electric latch, as of Jan. 7, 2009, 1 page, at http://www.eberhard.com/ProductDetail.aspx?product=487.

* cited by examiner

ROTARY ELECTRONIC UTILITY BOX LOCKING SYSTEM

CROSS-REFERENCE

The present application claims the benefit of Provisional Application No. 61/065,558 filed Feb. 12, 2008, which is incorporated herein by reference.

TECHNICAL FIELD OF INVENTION

The invention relates in general to locking mechanisms, and more particularly to locking mechanisms for storage compartments of service bodies mounted on trucks and other vehicles.

BACKGROUND

This invention is a rotary electronic utility box locking system for application in service bodies to be installed on trucks and other vehicles. A service body typically includes a plurality of utility boxes, tool boxes, and other storage compartments that are individually enclosed with hinge-mounted doors. Prior to the subject invention, the hinge-mounted doors were secured only by a lock on the individual compartment door handles, or by a manually operated, linear-actuated mechanical system and padlock.

The linear-actuated mechanical system consists of a rod assembly that passes through a series of brackets mounted to the interior or exterior of the storage, compartments. The mounting brackets are adapted to receive the rod assembly when it is in a locked position. The rod assembly extends to the outer surface of the service body and through a padlock bracket. The rod assembly is manually secured by placing a padlock through the padlock bracket thereby preventing unauthorized access to the storage compartments.

The linear-actuated mechanical system requires the user to manually lock and unlock the padlock that secures the rod assembly and manually move the rod assembly from its locked, position in order to gain access to the storage compartments. The manual process can be time consuming and inconvenient, especially when the user is required to repeatedly lock and unlock the storage compartments during the course of work.

Attempts to address these problems can be found in the Latch-Matic® locking system available from Reading Truck Body, Inc. of Shillington, Pa. and the electric latch available from Eberhard Hardware Manufacturing Company of Strongsville, Ohio. Both of these electronic locking systems deal solely with automatically locking the handles of the individual utility boxes or storage compartments, however, and do not offer the additional security of a system independent of the locks on the handles of utility boxes and other storage compartments. These systems also require the use of individual actuators for each utility box or storage compartment, adding to the cost of the system.

For the foregoing reasons there is a need for an electronic utility box locking system that is convenient and inexpensive and provides the additional security of a system independent of the locks on the handles of the utility boxes or storage compartments.

SUMMARY

To meet this and other needs, and in view of its purposes, the present invention provides a rotary electronic utility box locking system that allows the user to lock and unlock the utility boxes or storage compartments of a service body mounted to a truck or other vehicle without the need to manually lock and unlock a padlock securing the rod assembly, or manually locking and unlocking the locks on the handles of individual utility boxes or storage compartments. The system also provides the user with the additional security of an automatic locking system that can be a primary system or, in conjunction with locking the handles of the utility boxes or storage compartments, a secondary locking system. The system utilizes one actuator for multiple compartments allowing a simple electrical system and an inexpensive design.

A rotary electronic utility box locking system having the features of the present invention comprises a rotating rod assembly attached to the interior of the utility boxes or storage compartments using rod mounting plates. Striker plates are attached to the interior of the utility boxes or storage compartments doors. Striker assemblies are attached to and positioned along the length of the rotating rod assembly in locations such that as the rotating rod assembly is rotated in one direction, the striker assemblies engage the striker plates to lock the utility box or storage compartment doors. When the rotating rod assembly is rotated in the opposite direction, the striker assemblies disengage from the striker plates to unlock the utility box or storage compartment doors. An electronic actuator is mounted to the inside of a storage compartment in proximity to the rotating rod assembly. An electrical signal is sent to the electronic actuator causing the electronic actuator to rotate the rotating rod assembly to engage or disengage the striker assemblies with or from the striker plates.

The rotary electronic utility box locking system may be operated using a wireless remote device like a remote key fob, or by wiring the electronic actuator to the vehicle's factory-installed electric door lock system.

The advantages to the rotary electronic utility box locking system include the convenience of being able to lock and unlock all of the utility boxes or storage compartments on the service body of a truck or other vehicle remotely without having to take the time to manually lock and unlock the individual door handles of the utility boxes or storage compartments. Also advantageous is that multiple storage compartments can be locked and unlocked with a single electronic actuator providing for a simple and cost effective electrical system. Further, the rotary electronic utility box locking system can act as a primary or a secondary locking system providing additional security for the owner of the truck or other vehicle.

It is to be understood that both the foregoing general description and the following detailed description are exemplary, but are not restrictive, of the invention.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features are arbitrarily expanded or reduced for clarity. Included in the drawings are the following figures.

DETAILED DESCRIPTION OF INVENTION

The invention will be described in connection with an electronic locking system for metal utility boxes or storage compartments of the type utilized on services bodies installed on road vehicles such as trucks. The invention will also be described with reference to one side of the service body but is equally applicable to both sides as well as tool boxes or storage compartments located in the bed of the truck or other vehicle.

Figure 1:
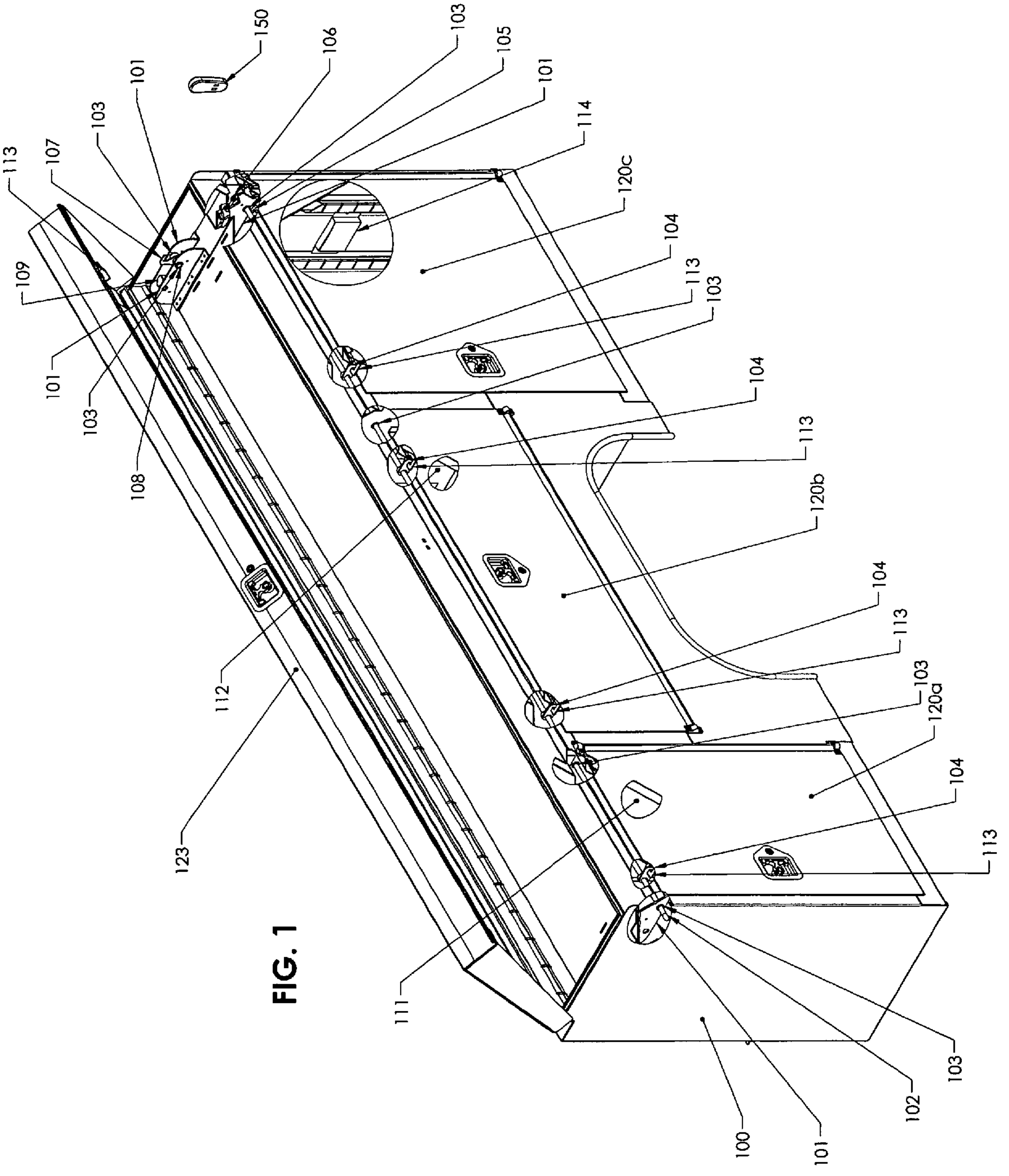
FIG. 1 is a longitudinal perspective view of one side of a service body for a truck or other vehicle, partially cut away showing (a) the rotary electronic utility box locking system including a rotating rod assembly for use with side compartments, striker assemblies, striker plates, rod mounting plates, bushings, and an electronic actuator; and (b) an embodiment of the invention for a top storage compartment including a shorter rotating rod assembly, a striker assembly, a striker plate, rod mounting plates, and an electronic actuator.

With reference to FIG. 1, there is shown one side of a service body 100 for a truck or other vehicle, equipped with a rotary electronic utility box locking system. The particular service body 100 shown has three side compartments 120*a*, 120*b*, and 120*c*, and one top compartment 123, although the present invention is applicable to other numbers and arrangements of storage compartments on the service bodies of trucks and other vehicles. As shown in FIG. 1, a rotary electronic utility box locking system for a service body 100 having side compartments 120*a*, 120*b*, and 120*c* and a top compartment 123 comprises a rotating rod assembly 102 for the side compartments, two rod mounting plates 101 for mounting the side compartment rotating rod assembly 102 to the interior of side compartments 120*a*, 120*b*, and 120*c* of the service body 100. Striker assemblies 104 are attached to the rotating rod assembly 102 and positioned along the length of the rotating rod assembly 102 so as to align the striker assemblies 104 with the striker plates 113, attached to the inside of the doors of the side compartments 120*a*, 120*b*, and 120*c*. For locking and unlocking the top compartment 123 of the service body 100, a second rotating rod assembly 108 is mounted to the inside of the top compartment 123 of the service body 100 utilizing two rod mounting plates 101. A pivot arm/top striker assembly 107 is attached to the second rotating rod assembly 108 and is used in proximity to one of the rod mounting plates 101 for engaging and disengaging a single striker plate 113 attached to the inside of the door of the top compartment 123.

In the preferred embodiment of the invention, a first electronic actuator 106 is connected pivotally to the rotating rod assembly 102 by a pivot arm 105. When the first electronic actuator 106 is electrically actuated it rotates the rotating rod assembly 102 mounted inside of the side compartments of the service body 100, and the striker assemblies 104 engage (lock) or disengage (unlock) the striker plates 113. A second electronic actuator 109 is connected pivotally to the top rotating rod assembly 108 by a pivot arm/top striker assembly 107. An electronic control module/receiver 114 is electrically connected to the first electronic actuator 106 and also electrically connected to the second electronic actuator 109. The electronic control module/receiver 114 receives a wireless signal from a wireless remote key fob 150, and electrically actuates the first electronic actuator 106 to rotate the rotating rod assembly 102, causing the plurality of striker assemblies 104 to engage with or disengage from the plurality of striker plates 113, and also electrically actuates the second electronic actuator 109 to rotate the rotating rod assembly 108 causing the pivot arm/top striker assembly 107 to engage with or disengage from a single striker plate 113.

The rod mounting plates 101 are made of zinc plated cold rolled steel, or alternatively other materials such as aluminum or stainless steel. The side compartment rotating rod assembly 102 and top compartment rotating rod assembly 108 are also made of zinc plated cold rolled steel, or alternatively other materials such as aluminum or stainless steel. An insulating bushing 103 is mounted on the rotating rod assembly 102 at the location of the rod mounting plates 101, and also at the locations where the rotating rod assembly 102 penetrates the left upright 111 and the right upright 112 of side compartments 120*a*, 120*b*, and 120*c*. The bushing 103 may be made of nylon, or alternatively other plastic or polymeric material, and is pressed onto the rotating rod assembly 102. Similar bushings 103 may be pressed onto the rotating rod assembly 108.

The striker assemblies 104, pivot arm 105, and pivot arm/top striker assembly 107 are made of zinc plated cold rolled steel or alternatively other materials such as aluminum or stainless steel. The striker assemblies 104 are attached to the rotating rod assembly 102 by a set screw. The striker plates 113 are attached to the interior of the storage compartments 120*a*, 120*b*, and 120*c* by welding, or alternatively by attaching with fasteners such as bolts or screws. The first electronic actuator 106, the second electronic actuator 109, and the electronic control module/receiver are of the kind commonly used in the industry, and are attached to rod mounting plates 101 with fasteners such as bolts or screws.

Figure 2B:
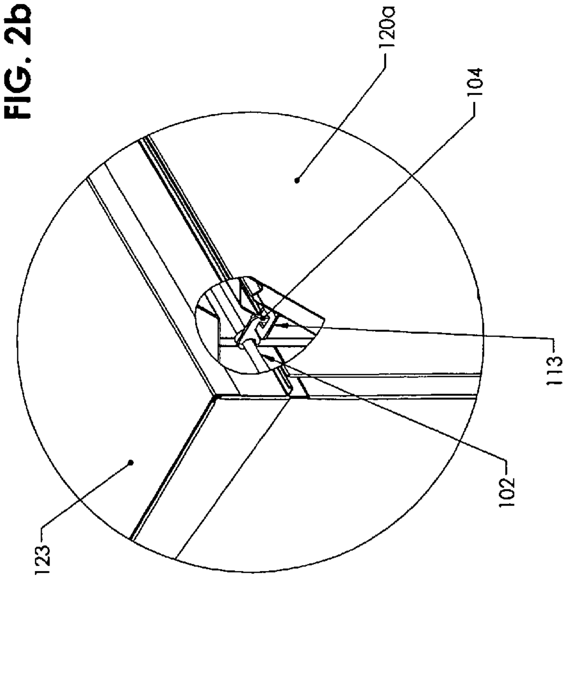
FIG. 2*b* is an enlarged longitudinal perspective view of a side compartment of FIG. 1, partially cut away showing a striker assembly and a striker plate in the engaged (locked) position.
Figure 2A:
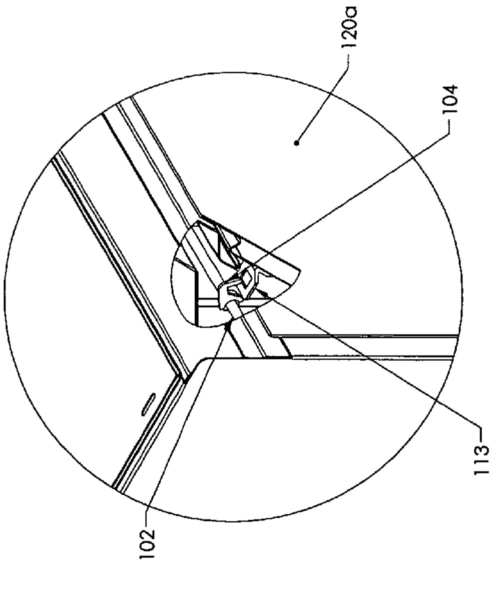
FIG. 2*a* is an enlarged longitudinal perspective view of a side compartment of FIG. 1, partially cut away showing a striker assembly and a striker plate in the disengaged (unlocked) position.

Referring to FIG. 2*a*, there is shown a partially cut away enlarged view of the side compartment rotating rod assembly 102, striker assembly 104, and striker plate 113 for the left side compartment 120*a* of a service body 100 in the disengaged (unlocked) position.

In FIG. 2*b* there is shown a partially cut away enlarged view of the rotating rod assembly 102, striker assembly 104, and striker plate 113 for the left side compartment 120*a* of a service body 100 in the engaged (locked) position.

Figure 3B:
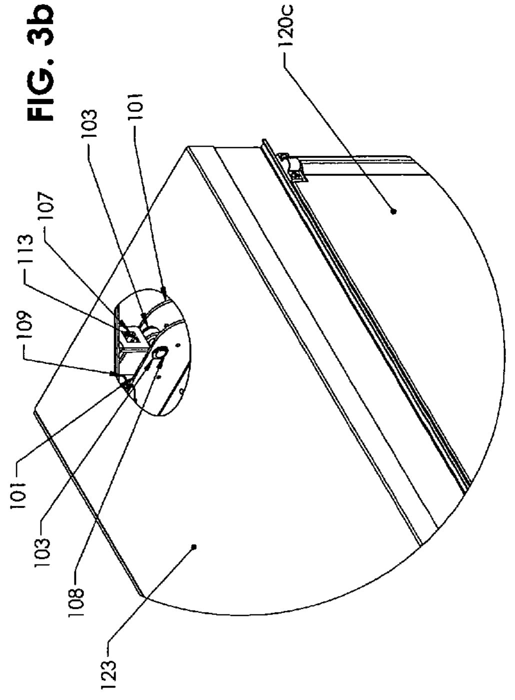
FIG. 3*b* is an enlarged longitudinal perspective view of the top compartment of FIG. 1, partially cut away showing two rod mounting plates, a top pivot arm/striker assembly, and a striker plate in the engaged (locked) position.
Figure 3A:
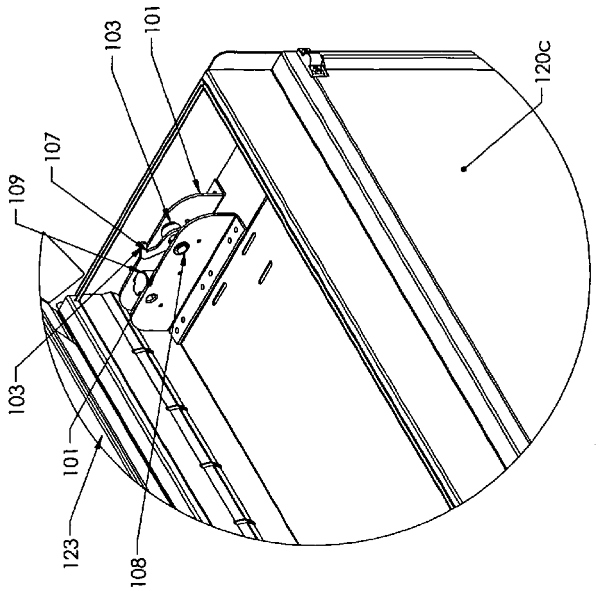
FIG. 3*a* is an enlarged longitudinal perspective view of the top compartment of FIG. 1, partially cut away showing two rod mounting plates, a-top pivot arm/striker assembly, and a striker plate in the disengaged (unlocked) position.

Referring to FIG. 3*a*, there is shown a partially cut away enlarged view of the top compartment rotating rod assembly 108, rod mounting plates 101, second electronic actuator 109, pivot arm/top striker assembly 107, and striker plate 113 for the top compartment 123 of the service body 100 in the disengaged (unlocked) position.

In FIG. 3*b* there is shown a partially cut away enlarged view of the top compartment rotating rod assembly 108, rod mounting plates 101, second electronic actuator 109, top pivot arm/striker assembly 107, and striker plate 113 for the top compartment 123 of the service body 100 in the engaged (locked position).

Figure 4A:
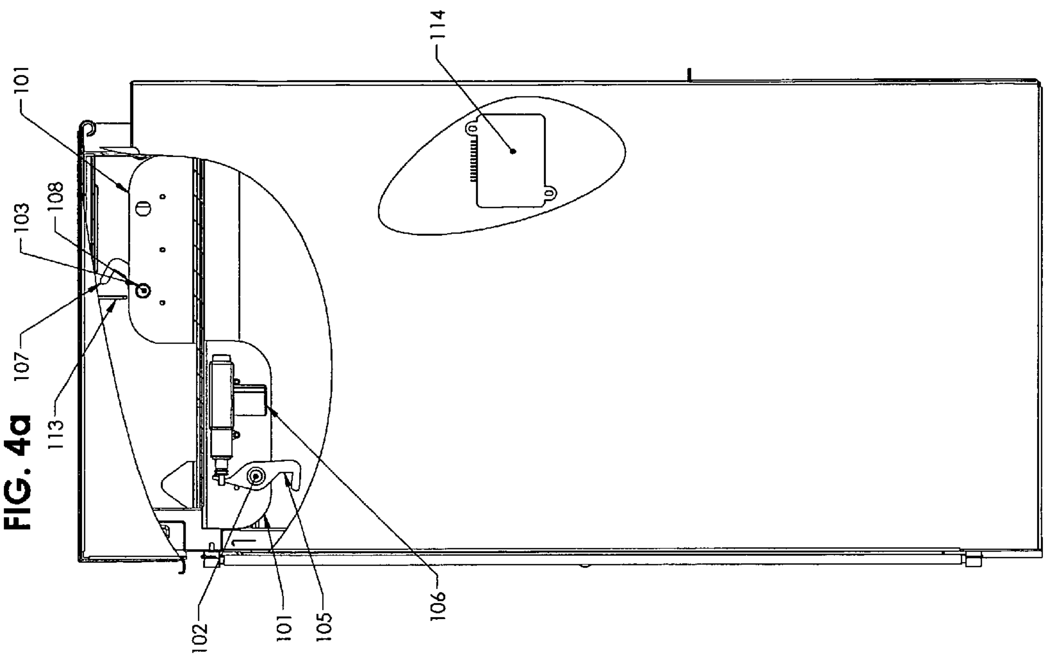
FIG. 4*a* is a side view of the service body of FIG. 1, partially cut away showing rod mounting plates, a top pivot arm/striker assembly, a striker plate, an electronic actuator, an electronic control module, and a pivot arm in the disengaged (unlocked) position.

Referring to FIG. 4*a* there is shown a partially cut away side view of rod mounting plates 101, first electronic actuator 106, and pivot arm 105 for pivotally connecting the first electronic actuator 106 to the rotating rod assembly 102 so as to rotate the rotating rod assembly 102. The first electronic actuator 106 and the pivot arm 105 are shown in the disengaged (unlocked) position. Also shown are the top compartment rotating rod assembly 108, top pivot arm/striker assembly 107, and striker plate 113 in the disengaged (unlocked) position. The electronic control module/receiver 114 is attached to the inside of right side compartment 120*c* with fasteners such as bolts or screws.

Figure 4B:
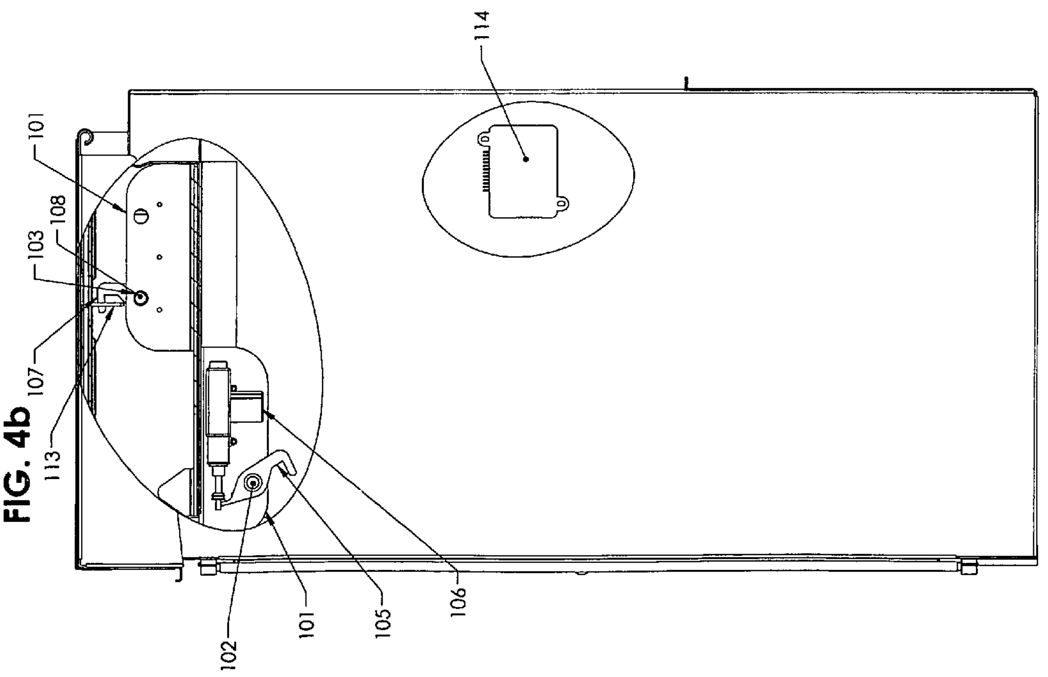
FIG. 4*b* is a side view of the service body of FIG. 1, partially cut away showing rod mounting plates, a top pivot arm/striker assembly, a striker plate, an electronic actuator, an electronic control module, and a pivot arm in the engaged (locked) position.

In FIG. 4*b* there is shown a partially cut away side view of rod mounting plates 101, first electronic actuator 106, and pivot arm 105 for pivotally connecting the first electronic actuator 106 to the rotating rod assembly 102 so as to rotate the rotating rod assembly 102. The electronic actuator 106 and the pivot arm 105 are shown in the engaged (locked) position. Also shown are top compartment rotating rod assembly 108, top pivot arm/striker assembly 107, and striker plate 113 in the engaged (locked) position. The electronic control module/receiver 114 attached to the inside of right side compartment 120*c* with fasteners such as bolts or screws.

Figure 5:
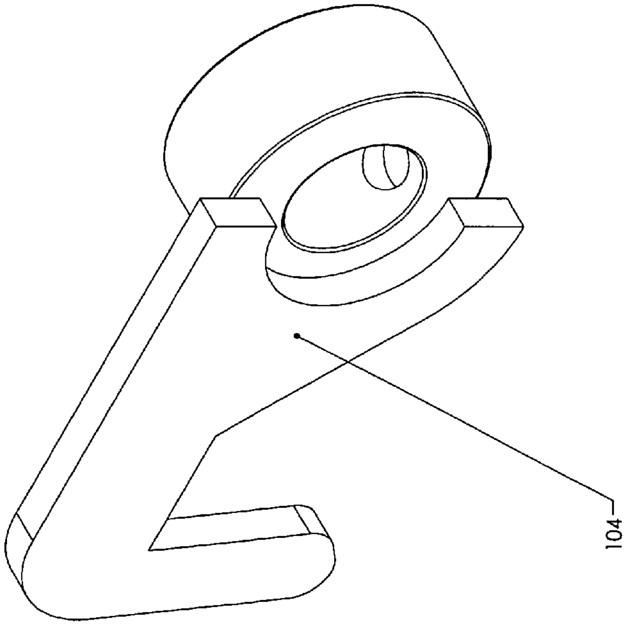
FIG. 5 is an enlarged perspective view of the striker assembly of FIG. 1.

Referring to FIG. 5 there is shown an enlarged perspective view of a striker assembly 104.

Figure 6:
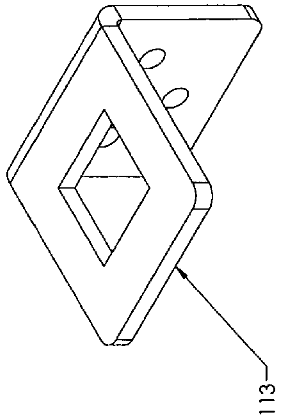
FIG. 6 is an enlarged perspective view of the striker plate of FIG. 1.

In FIG. 6 there is shown an enlarged perspective view of a striker plate 113.

As noted above, storage compartments on service vehicles have traditionally been locked utilizing key locks on each of the handles of the individual storage compartments. While this configuration affords a manual system for locking and unlocking the storage compartments, it is time consuming and provides no backup in the way of a secondary system. In accordance with the important features of the present invention, a rotary electronic utility box locking system is used to quickly and efficiently lock or unlock the storage compartments on a service vehicle by using a remote device.

Among the advantages to the rotary electronic utility box locking system are that it is fast and convenient, and provides a locking system that may be utilized as the primary system, or as a backup system to the key locks on the handles of the individual storage compartments.

Figure 7:
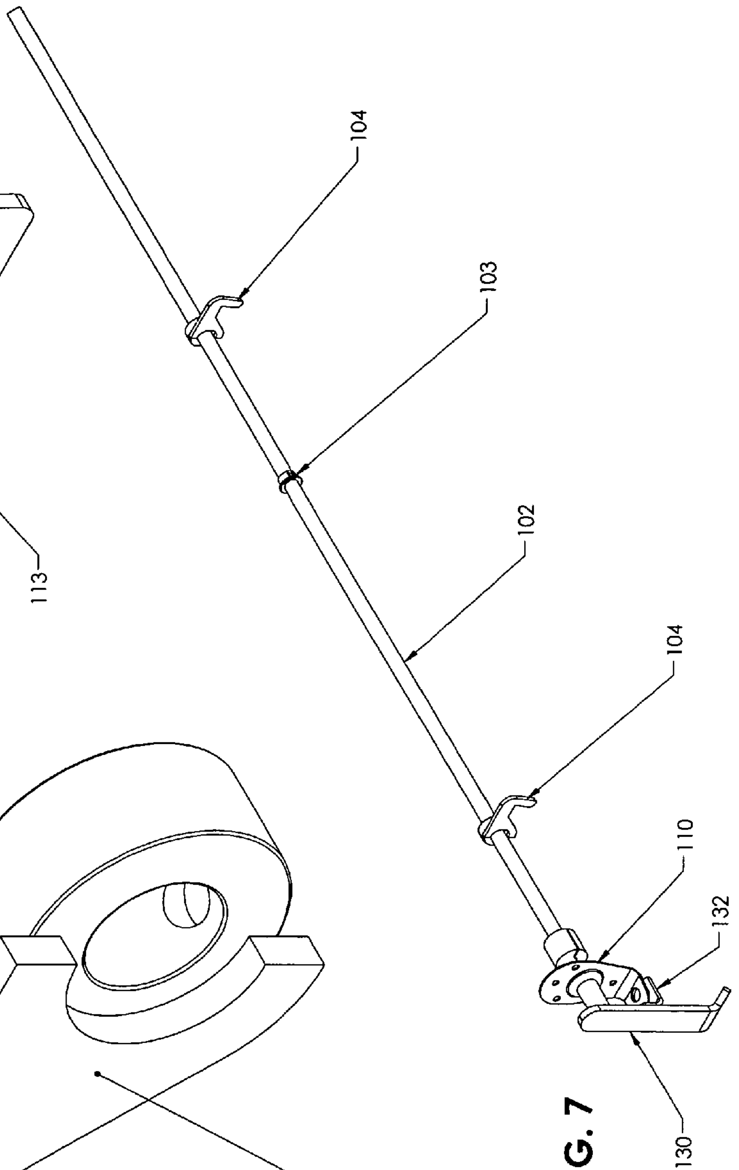
FIG. 7 is an enlarged view of one embodiment of the invention demonstrating an alternative manual locking system.

In FIG. 7, there is shown separately a manual embodiment of the rotary electronic utility box locking system. The manual version of the rotary electronic utility box locking system uses the same side compartment rotating rod assembly 102, at least two rod mounting plates 101 (not shown), one or more striker assemblies 104, one or more striker plates 113 (not shown), and one or more bushings 103 as in the electronic version except that a manual lock bracket 110 including a bottom hole for receiving a padlock or combination lock is fixed to the service body 100. A manual lock handle 130 with a protruding tab 132 is provided, the tab 132 having a hole for receiving a padlock or combination lock. The lock handle 130 extends through the manual lock bracket 110 and connects to the rotating rod assembly 102 so that manually rotating the lock handle 130 also rotates the rotating rod assembly 102 to engage (lock) or disengage (unlock) the side compartments 120*a*, 120*b*, and 120*c* of the service body 100. When the rotating rod assembly 102 is in the locked position, the hole in the protruding tab 132 of the lock handle 130 aligns with the bottom hole of the manual lock bracket 110 such that a padlock or combination lock. may be placed through both the bottom hole in the manual lock bracket 110 and the hole in the tab 132 of the manual lock handle 130 to lock to the rotating rod assembly 102.

The manual lock handle 130 and manual lock bracket 110 are made of zinc plated cold rolled steel or alternatively other materials such as other metals. The manual lock bracket 110 is bolted or welded to the side of the service body 100. The manual lock handle 130 is coupled to the rotating rod assembly 102 using a set screw.

The purpose of this embodiment is to provide an inexpensive method for manually locking a number of compartment doors at one time thereby reducing the time required for locking and unlocking the compartment doors. This embodiment also provides a secondary locking system to the vehicle's door handle locks providing additional security.

Figure 8:
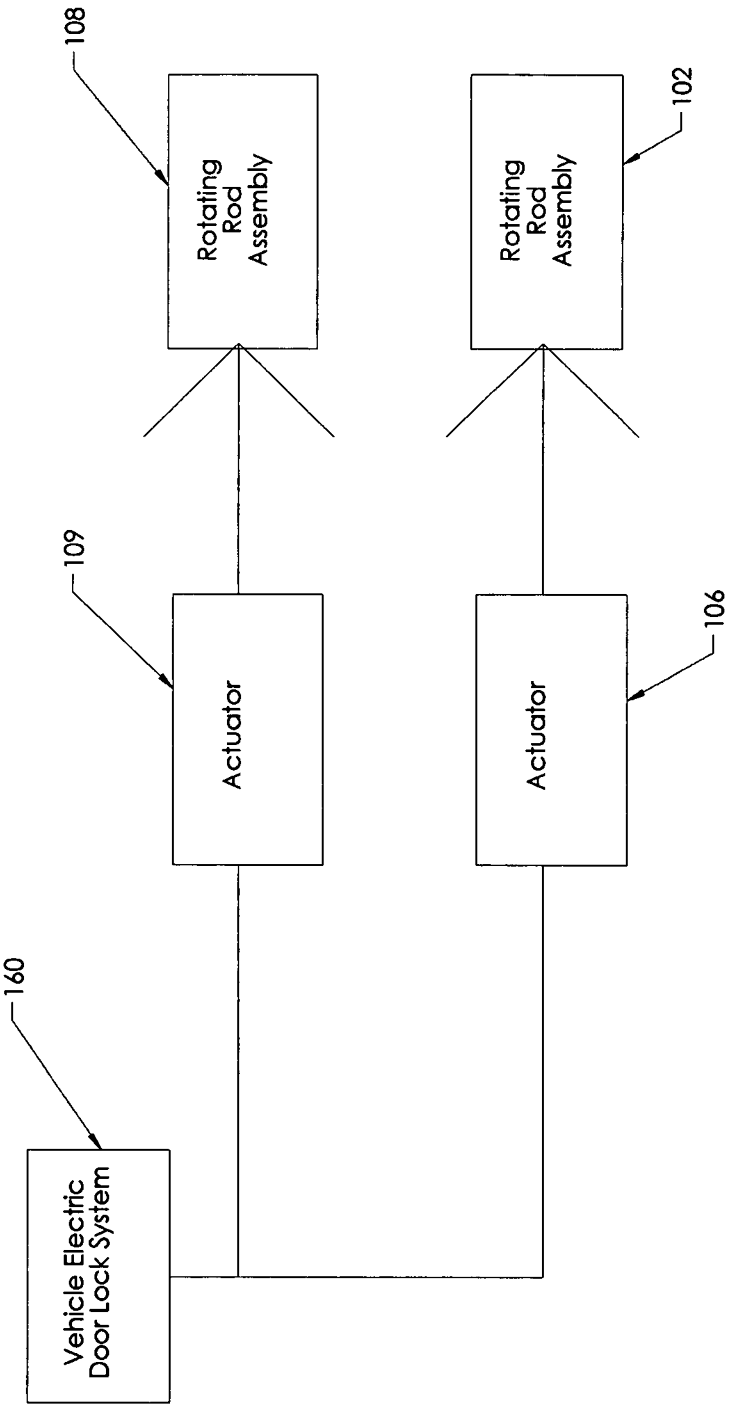
FIG. 8 is a system schematic showing one embodiment of the invention wherein the electronic actuator is connected to a vehicle's factory-installed automatic door locks.

In another embodiment of the invention shown in FIG. 8 the first electronic actuator 106 and second electronic actuator 109 are electrically connected to a vehicle's factory-installed electric door lock system 160. The remote device which operates the factory-installed electric door lock system also provides the electrical signal to the first electronic actuator 106, to rotate the rotating rod assembly 102 to lock or unlock the side compartments. At the same time the remote device which operates the factory-installed electric door lock system also provides the electrical signal to the second electronic actuator 109, to rotate the top compartment rotating rod assembly 108 to unlock the top compartment.

Although the present invention has been described in considerable detail with reference to the preferred and other embodiments thereof, other versions are possible. It is to be understood that changes in details may be made as a matter of engineering choice without departing from the spirit and scope of the invention. As an example, different materials may be available for making the rotating rod assembly 102, top rotating rod assembly 108, striker plates 113, pivot arm 105, striker assemblies 104; manual lock bracket 110, and manual lock handle 130 such as aluminum and stainless steel. The spirit and scope of the appended claims should not be limited to the description of the preferred versions contained herein.

In the Summary above and in the Detailed Description of the Invention, in the claims below, and in the accompanying drawings, reference is made to particular features of the invention. It is to be understood that the disclosure of the invention in this specification includes all possible combinations of such particular features.

What is claimed is:

1. An apparatus for locking and unlocking one or more storage compartments having an interior enclosed with doors, the apparatus comprising:

a rotating rod assembly having a length;

at least two rod mounting plates for mounting the rotating rod assembly to the interior of one or more storage compartments;

one or more striker plates attached to the doors of one or more storage compartments and arranged so that there is one or more striker plate per door;

one or more striker assemblies attached to the rotating rod assembly and positioned along the length of the rotating rod assembly so that each of the one or more striker assemblies aligns with one striker plate;

an electronic actuator for rotating the rotating rod assembly so as to cause the one or more striker assemblies to engage (lock) with and disengage (unlock) from the one or more striker plates;

an electronic control module/receiver electrically connected to the electronic actuator to signal the electronic actuator; and a wireless key fob for sending a wireless signal to the electronic control module/receiver to signal the electronic control module/receiver to actuate the electronic actuator to rotate the rotating rod assembly and engage (lock) or disengage (unlock) the one or more striker assemblies from the one or more striker plates.

2. The apparatus as in claim 1, wherein the one or more striker plates are welded to the inside of the one or more storage compartment doors.

3. The apparatus as in claim 1, wherein the one or more striker plates are bolted to the inside of the one or more storage compartment doors.

4. The apparatus as in claim 2, wherein the rotating rod assembly, at least two rod mounting plates, one or more striker plates, and one or more striker assemblies are made from zinc plated cold rolled steel.

5. The apparatus as in claim 3, wherein the rotating rod assembly, at least two rod mounting plates, one or more striker plates, and one or more striker assemblies are made from zinc plated cold rolled steel.

6. An apparatus for locking and unlocking one or more storage compartments having an interior enclosed with doors, the apparatus comprising:

a rotating rod assembly having a length;

at least two rod mounting plates for mounting the rotating rod assembly to the interior of one or more storage compartments;

one or more striker plates attached to the doors of one or more storage compartments and arranged so that there is one or more striker plate per door;

one or more striker assemblies attached to the rotating rod assembly and positioned along the length of the rotating rod assembly so that each of the one or more striker assemblies aligns with one striker plate; and an electronic actuator for rotating the rotating rod assembly so as to cause the one or more striker assemblies to engage (lock) with and disengage (unlock) from the one or more striker plates, wherein the electronic actuator is adapted to be electrically connected to the factory-installed electric door lock system of a vehicle such that a wireless signal from a remote device supplied with the factory-installed electric door lock system signals the electronic actuator to rotate the rotating rod assembly and engage (lock) or disengage (unlock) the one or more striker assemblies with or from the one or more striker plates.

7. The apparatus as in claim 6, wherein the one or more striker plates are welded to the inside of the one or more-storage compartment doors.

8. The apparatus as in claim 6, wherein the one or more striker plates are bolted to the inside of the one or more storage compartment doors.

9. The apparatus as in claim 7, further wherein the rotating rod assembly, at least two rod mounting plates, one or more striker plates, and one or more striker assemblies are made from zinc plated cold rolled steel.

10. The apparatus as in claim 8, wherein the rotating rod assembly, at least two rod mounting plates, one or more striker plates, and one or more striker assemblies are made from zinc plated cold rolled steel.

11. An apparatus for locking and unlocking one or more storage compartments having an interior enclosed with doors, the one or more storage components located in a service body, the apparatus comprising:

a rotating rod assembly having a length;

at least two rod mounting plates for mounting the rotating rod assembly to the interior of one or more storage compartments;

one or more striker plates attached to the doors of one or more storage compartments and arranged so that there is one or more striker plates per door;

one or more striker assemblies attached to the rotating rod assembly and positioned along the length of the rotating rod assembly so that each of the one or more striker assemblies aligns with one striker plate;

a manual lock bracket with a bottom hole adapted to receive a padlock or combination lock, the manual lock bracket fixed to the service body; and a manual lock handle with a tab, the tab having a hole adapted to receive a padlock or combination lock, and the lock handle having a rod extending through the manual lock bracket and connecting to the rotating rod assembly so that manually rotating the lock handle also rotates the rotating rod assembly to engage (lock) or disengage (unlock) the side compartments of the service body, the hole in the tab of the lock handle aligning with the bottom hole of the manual lock bracket when the rotating rod assembly is in its locked position such that a padlock or a combination lock may be placed through both the bottom hole in the manual lock bracket and the hole in the tab of the manual lock handle.

12. The apparatus as in claim 11, wherein the one or more striker plates are welded to the inside of the one or more storage compartment doors.

13. The apparatus as in claim 11, wherein the one or more striker plates are bolted to the inside of the one or more storage compartment doors.

14. The apparatus as in claim 12, wherein the rotating rod assembly, rod mounting plates, striker plates, striker assemblies, manual lock handle, and manual lock bracket are made from zinc plated cold rolled steel.

15. The apparatus as in claim 13, wherein the rotating rod assembly, rod mounting plates, striker plates, striker assemblies, manual lock handle, and manual lock bracket are made from zinc plated cold rolled steel.

* * * * *